United States Patent
Cattaneo et al.

(10) Patent No.: US 10,935,450 B2
(45) Date of Patent: Mar. 2, 2021

(54) SYSTEM FOR CONTROLLING THE PROPER FUNCTIONING OF INDUSTRIAL SCREWDRIVERS

(71) Applicant: ATLAS COPCO INDUSTRIAL TECHNIQUE AB, Stockholm (SE)

(72) Inventors: Massimiliano Cattaneo, Paderno Dugnano (IT); Gianmaria Celico Fadini, Paderno Dugnano (IT)

(73) Assignee: ATLAS COPCO INDUSTRIAL TECHNIQUE AB, Stockholm (SE)

( * ) Notice: Subject to any disclaimer, the term of this patent is extended or adjusted under 35 U.S.C. 154(b) by 110 days.

(21) Appl. No.: 16/306,541

(22) PCT Filed: Jul. 19, 2017

(86) PCT No.: PCT/IB2017/054374
§ 371 (c)(1),
(2) Date: Nov. 30, 2018

(87) PCT Pub. No.: WO2018/015906
PCT Pub. Date: Jan. 25, 2018

(65) Prior Publication Data
US 2019/0162620 A1    May 30, 2019

(30) Foreign Application Priority Data

Jul. 20, 2016 (IT) .................. UA2016A005332

(51) Int. Cl.
*G01L 25/00* (2006.01)
*G01M 99/00* (2011.01)

(52) U.S. Cl.
CPC ......... *G01L 25/003* (2013.01); *G01M 99/007* (2013.01)

(58) Field of Classification Search
CPC .................. G01L 25/003; G01M 99/007
See application file for complete search history.

(56) References Cited

U.S. PATENT DOCUMENTS 6,938,471 B2 *  9/2005  Nakano .............. G01L 5/28
                                          303/119.2
9,766,143 B2 *  9/2017  Traballoni .......... G01L 5/28
(Continued)

FOREIGN PATENT DOCUMENTS

WO    2014203117 A1    12/2014
WO    2016103150 A1    6/2016

OTHER PUBLICATIONS

International Search Report for corresponding application PCT/IB2017/054374 filed Jul. 19, 2017; dated Nov. 7, 2017.
(Continued)

*Primary Examiner* — Freddie Kirkland, III
(74) *Attorney, Agent, or Firm* — Cantor Colburn LLP

(57) ABSTRACT

System for verifying the proper functioning of industrial screwdrivers placed on a test bench that has a plurality of hydraulic brakes (F), with which the screwdriver is associated, suitably controlled by a hydraulic circuit comprising one pump (P), which withdraws the fluid from a reservoir (T) and provides it to a pressure regulating valve (VP), which in turn provides it to the brakes. Each brake is provided with measuring transducers (TR), connected to an electronic driver board (SP). A computer (U) communicates with such card and comprises a suitable driving program stored thereon, the driving program, once an operator has selected the brake to be used for testing the screwdriver, being able to progressively increase the braking capacity of the brakes by adjusting the pressure, until reaching a complete stop of the electronic screwdriver.

3 Claims, 5 Drawing Sheets

(56) References Cited

U.S. PATENT DOCUMENTS

| | | | |
|---|---|---|---|
| 10,317,304 B2* | 6/2019 | Boccellato | B25H 1/005 |
| 10,345,183 B2* | 7/2019 | Sartori | G01L 5/24 |
| 10,641,671 B2* | 5/2020 | Boccellato | G01L 25/003 |
| 10,641,675 B2* | 5/2020 | Boccellato | G01L 25/003 |
| 2003/0192376 A1 | 10/2003 | Nakano | |
| 2016/0138987 A1* | 5/2016 | Traballoni | G01L 25/003 73/121 |
| 2017/0356821 A1* | 12/2017 | Sartori | G01L 5/24 |
| 2017/0363500 A1* | 12/2017 | Boccellato | G01L 25/003 |
| 2018/0136060 A1* | 5/2018 | Boccellato | G01L 5/24 |
| 2018/0136070 A1* | 5/2018 | Boccellato | G01L 25/003 |

OTHER PUBLICATIONS

Written Opinion for corresponding application PCT/IB2017/054374 filed Jul. 19, 2017; dated Nov. 7, 2017.

* cited by examiner

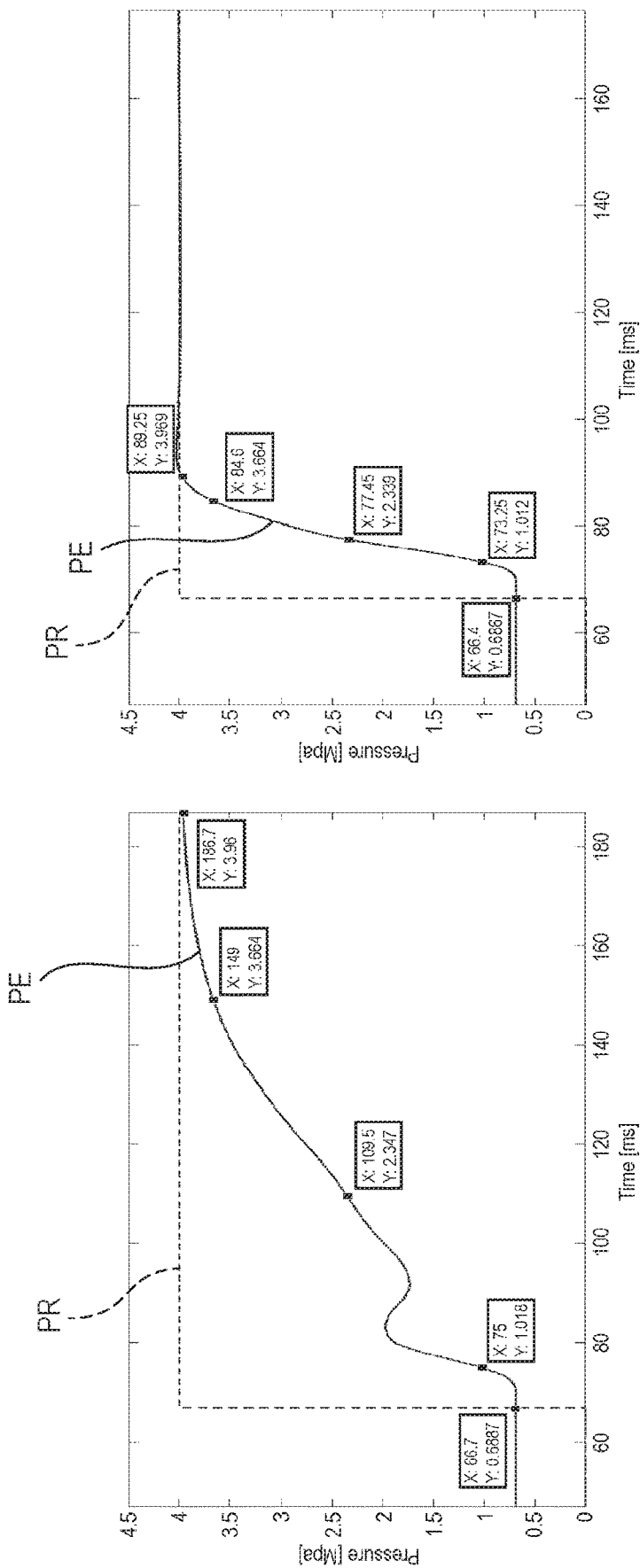

SYSTEM FOR CONTROLLING THE PROPER FUNCTIONING OF INDUSTRIAL SCREWDRIVERS

TECHNICAL FIELD

The present disclosure refers to a system for verifying the proper functioning of industrial screwdrivers by means of hydraulic braking devices placed on a test bench.

BACKGROUND

These screwdrivers are tested on test benches, such as the one shown in FIG. 1, described in the patent application WO2014203117 to the same applicant, which comprise a plurality of hydraulic brakes F, to which the screwdrivers A are associated. These brakes are suitably controlled by a hydraulic circuit comprising at least one pump P, at least one pressure regulating valve VP that provides the pressurised fluid to all the brakes of the bench. Each brake is provided with external measuring transducers TR, connected to a computer U and which are driven by an appropriate program stored thereon. This electronic unit controls both the pump and the pressure regulating valve.

Each brake is characterised by a maximum braking capacity thereof linked to the physical characteristics of the brake.

Normally, the brakes in a bench are different from each other, in order to be able to test different screwdrivers in the same bench.

The program SW, once the operator has selected the brake to be used for testing the screwdriver, is able to progressively increase the braking capacity, through the hydraulic circuit, until reaching a complete stop of the electronic screwdriver.

The test of a screwdriver is a procedure that involves carrying out a tightening sequence for which torque and angle are measured.

These values are used to compute metrics on which rules are to be applied to validate the correct operation of the screwdriver in terms of precision and repeatability.

Clearly carrying out correctly the test depends on the reliability of the brake used as well as on the screwdriver itself.

A brake is considered reliable if, when carrying out the same test, it simulates the same physical joint at each tightening. A reliability test must therefore also be provided for the brakes.

The applicant noted that the brakes of a known bench are all fed by the same hydraulic circuit, through a pressure regulating valve in common for all brakes. Downstream of such valve there is simply a division of the main duct coming out of the valve into as many conduits, one for each brake of the bench.

The maximum operating pressure for the hydraulic control unit is 100 bars, but 80 bars are generally used for problems of excessive leakage.

Instead, the brakes generally operate at a maximum pressure of 50 bars.

Therefore, the brakes are different from each other, but the pressure to be regulated is provided by a same hydraulic circuit.

This can result in a response in terms of braking which is not reliable for a brake compared to another.

BRIEF SUMMARY

One aspect of the present disclosure relates to a system for verifying the correct functioning of industrial screwdrivers by means of hydraulic braking devices having the features described herein.

BRIEF DESCRIPTION OF THE DRAWINGS

The features and advantages of the system according to the present disclosure will be clearer and evident from the following illustrative and non-limiting description, of an embodiment, made with reference to the attached figures illustrating respectively:

FIGS. 3-6 are graphs illustrating the performance over time of hydraulic pressure on these brakes during screwdriver tests;

DETAILED DESCRIPTION

With reference to the aforementioned figures, the bench or the verification system according to the present disclosure comprises a plurality of hydraulic brakes F, with which the screwdriver is associated, suitably controlled by a hydraulic circuit comprising at least one pump P, which withdraws the fluid from a reservoir T and provides it to a pressure regulating valve VP, which in turn provides it to the brakes.

In the system, there is also a manifold C for the collection of the fluid (i.e. oil) placed in the hydraulic circuit downstream of the brakes. The pump is provided with an accumulator ACC and a selector S for changing the maximum pressure of the circuit.

Each brake is provided with external measuring transducers TR, connected to an electronic driver board SP, which also controls such regulating valve VP. A computer U that communicates with such board comprises a suitable driving program stored thereon.

The driving program, once the operator has selected the brake to be used for testing the screwdriver A, is able to progressively increase the braking capacity of the brakes by adjusting the pressure, until reaching a complete stop of the electronic screwdriver.

According to the present disclosure, a hydraulic distributor D is present between such brakes F and the regulating valve VP, such hydraulic distributor comprising solenoid valves able to select, and activate each brake to which it is selectively connected.

Figure 1:
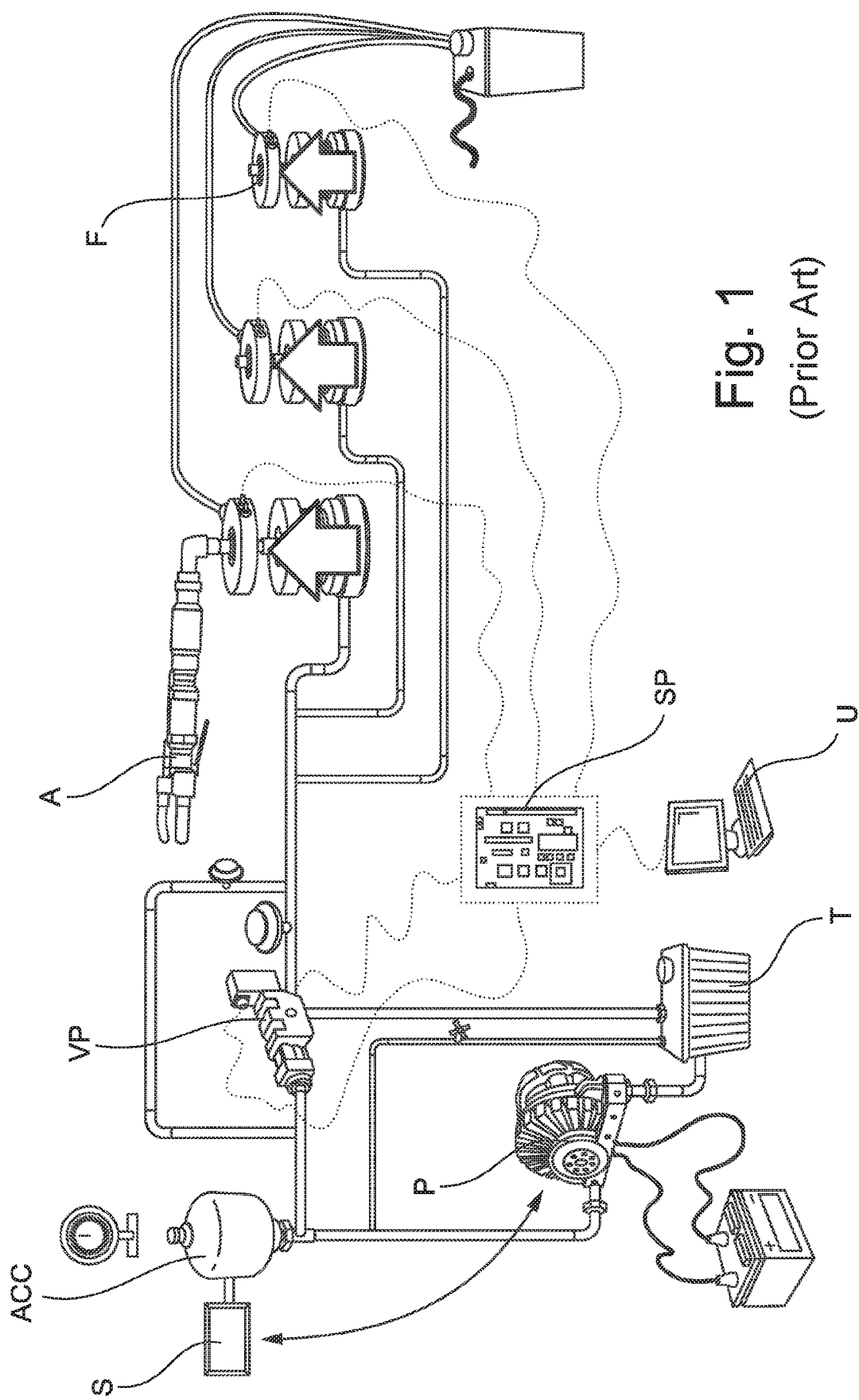
FIG. 1 shows an overview scheme of a test bench for verifying industrial screwdrivers according to the prior art.
Figure 2:
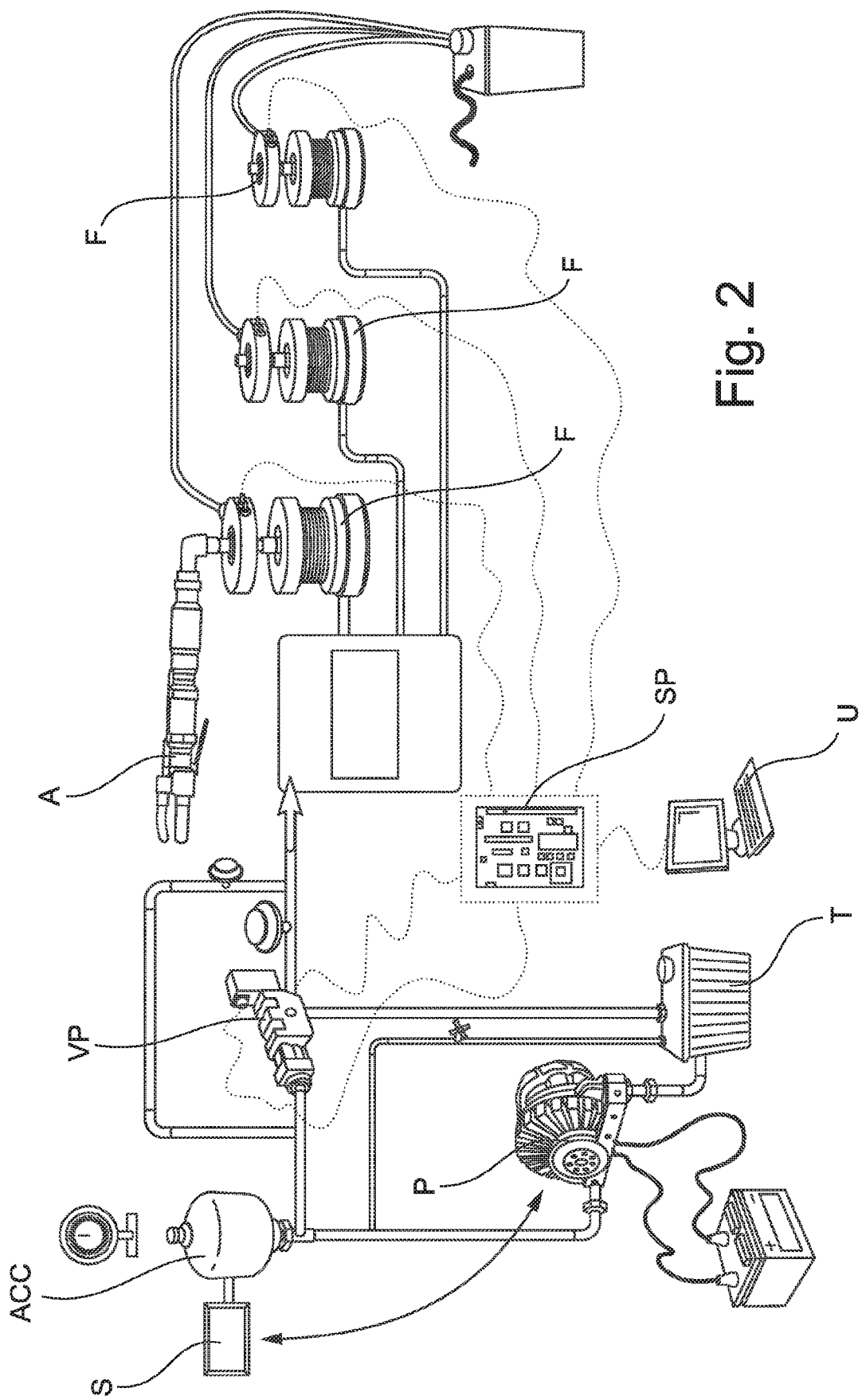
FIG. 2 shows an overview scheme of a test bench to which the system according to the present disclosure is applied.

As shown in FIG. 2, the hydraulic distributor D is a block comprising a number of solenoid valves E1 . . . En corresponding to the number of existing braking devices F1 . . . Fn. The electronic board is concerned with enabling the valve associated with the brake selected for the test, in this manner the hydraulic power will flow from the manifold to the only braking device involved in the test. To avoid consumption and safety problems, 3-way normally closed solenoid valves have been chosen.

In this manner, the pressure is adjusted individually for each brake, thus carrying out a dedicated control on each of them.

Figure 4:
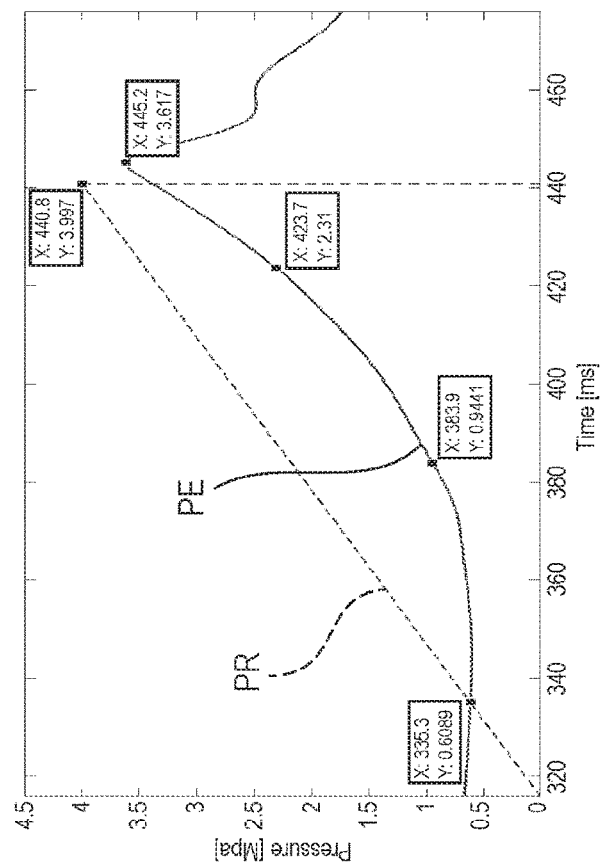
Figure 3:
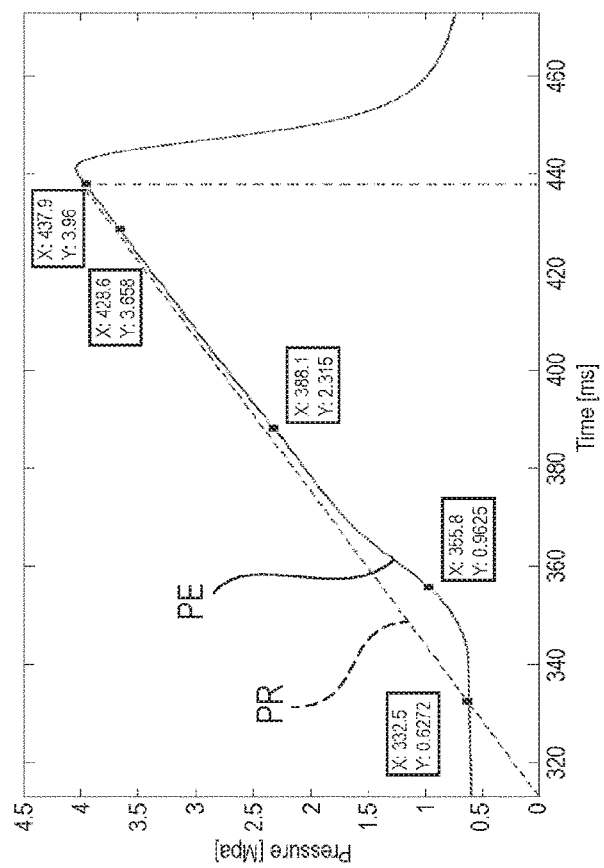
Figure 7:
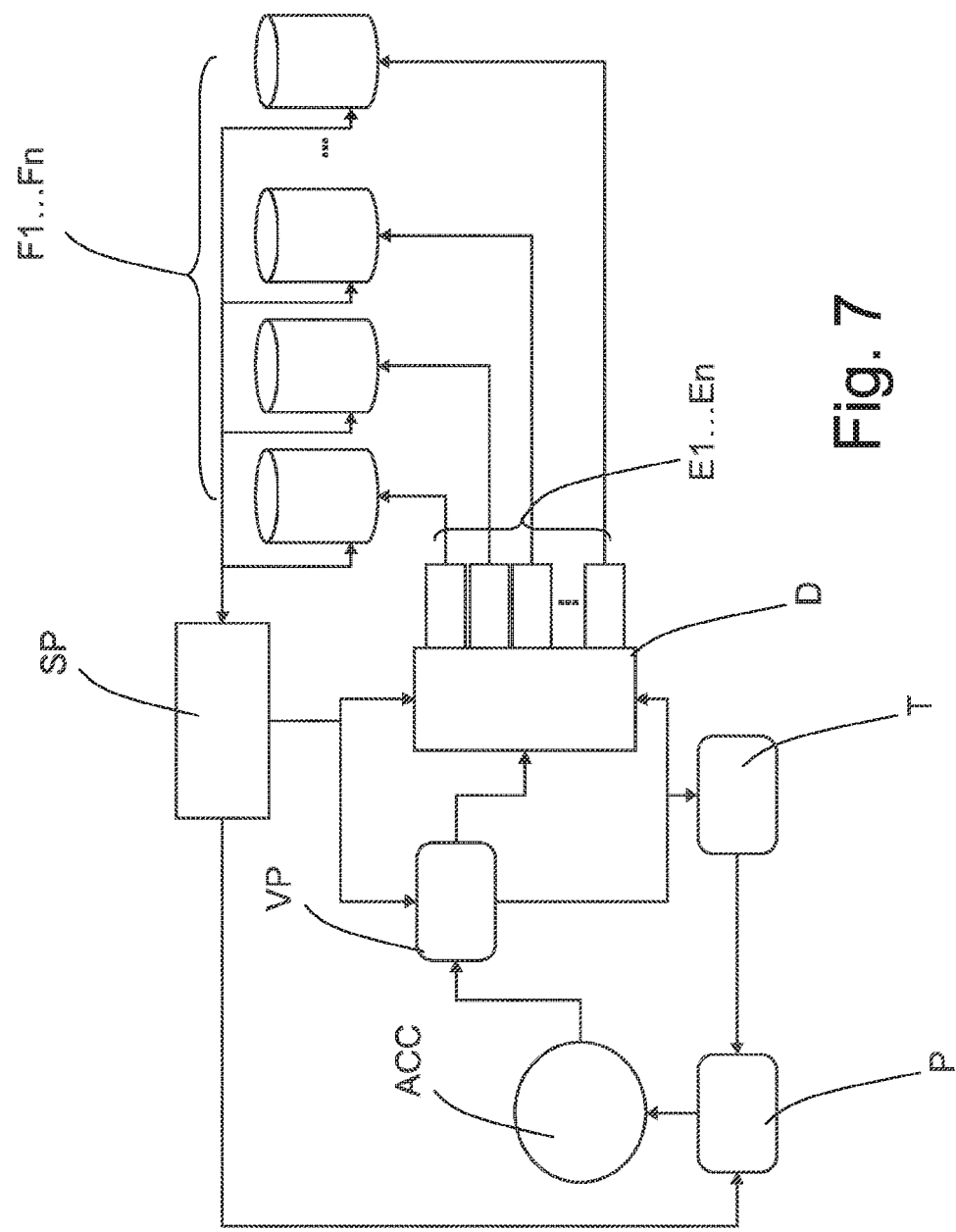
FIG. 7 schematically illustrates the hydraulic diagram of a bench of the type of FIG. 2.

Referring to FIGS. 3 and 4 illustrating graphs of the actual pressure PE applied on a brake and the reference pressure PR (sawtooth response) respectively for decoupled brakes as in the present disclosure and for brakes instead all fed by a same circuit, it can be seen how the circuit with the hydraulic distributor, can maintain the actual pressure much closer to the desired one.

In the same way in the graphs of FIGS. 5 and 6, it is verified that the desired pressure (square wave response) is achieved in a more precise and rapid way with the distributed brake control.

The invention claimed is:

1. System for verifying the proper functioning of industrial screwdrivers comprising a test bench,
    said bench comprising
        a plurality of hydraulic brakes (F), with which the screwdriver is associated, suitably controlled by a hydraulic circuit comprising at least one pump (P), which withdraws the fluid from a reservoir (T) and provides it to a pressure regulating valve (VP), which in turn provides it to the brakes,
        each brake being provided with measuring transducers (TR), connected to an electronic driver board (SP), which also controls such regulating valve (VP),
        a computer (U) that communicates with such board and that comprises a suitable driving program stored thereon,
        such driving program, once an operator has selected the brake to be used for testing the screwdriver, being able to progressively increase the braking capacity of the brakes by adjusting the pressure, until reaching a complete stop of the electronic screwdriver,
        a hydraulic distributor (D) is present between such brakes (F) and the regulating valve (VP), such hydraulic distributor comprising solenoid valves able to select, operate and control the hydraulic pressure of each brake to which it is selectively connected
    wherein such hydraulic distributor (D) comprises a number of solenoid valves (E1 . . . En) corresponding to the number of braking devices present (F1 . . . Fn), the electronic board (SP) is concerned with enabling the solenoid valve associated with the brake selected for the test, in this manner the hydraulic power flows from the manifold to the only braking device involved in the test, wherein such solenoid valves are normally closed three-way solenoid valves.

2. System according to claim 1, further comprising a manifold (C) for the collection of the fluid placed in the hydraulic circuit downstream of the brakes.

3. System according to claim 1, wherein the pump is provided with an accumulator (A) and a selector (S) for changing the maximum pressure of the circuit.

* * * * *